United States Patent [19]

De Zarate

[11] Patent Number: 4,706,559

[45] Date of Patent: Nov. 17, 1987

[54] HIGHLY RELIABLE JUICE EXTRACTOR

[75] Inventor: Luis C. O. De Zarate, San Sebastian, Spain

[73] Assignee: Sammic, S.A., Paseo de la Castellana, Spain

[21] Appl. No.: 844,873

[22] Filed: Mar. 27, 1986

[30] Foreign Application Priority Data

Dec. 16, 1985 [ES] Spain .................................... 291063
Dec. 16, 1985 [ES] Spain .................................... 291064

[51] Int. Cl.$^4$ ............................................. A23N 1/00
[52] U.S. Cl. ..................................... 99/504; D7/49; 99/501
[58] Field of Search .......... 99/495, 509, 510, 511–513, 99/501–505, 506–508; D7/49, 48

[56] References Cited

FOREIGN PATENT DOCUMENTS 1164016 10/1958 France .................................... 99/504

Primary Examiner—Timothy F. Simone
Attorney, Agent, or Firm—Laurence R. Brown

[57] ABSTRACT

A motorized juice extractor has a cylindrical extruded main body with a base stand providing a reel for winding up and concealing part or all of the electric supply cable. The rotatable extracting cone has a surrounding body attachment substantially in the form of two mating semi-spherical bodies pressure fit together. In one embodiment, an upper lever arm has a cap mating over the rotatable cone for squeezing a product when juicing. This lever arm has a cam actuating a motor drive switch when the cap mates over the cone. This embodiment has a pulp filter centrifugally rotatable with the cone.

10 Claims, 4 Drawing Figures

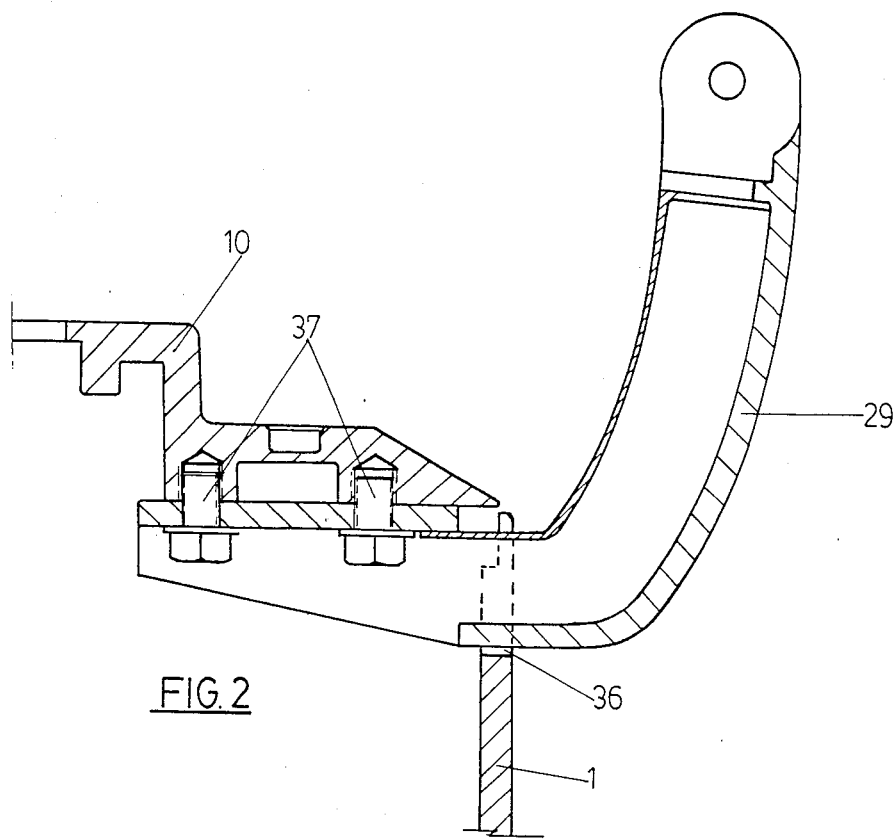
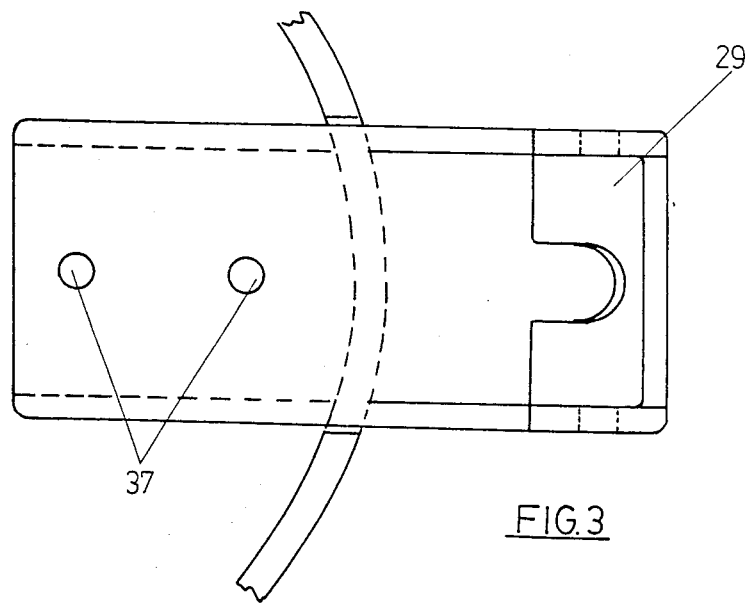

HIGHLY RELIABLE JUICE EXTRACTOR

BACKGROUND OF THE INVENTION

The present invention concerns a "highly reliable juice extractor", which, in addition to its specific function, also offers the essential features of novelty, simplicity and efficiency, which constitute appreciable advantages over what was known in this field and available in the corresponding commercial sector up til now.

Exhaustive investigation has been carried out to project and accomplish the objective of developing the technical and functional perfection of this type of appliance, incorporating suitable discoveries as suggested by practical experience, in order to make it more precise, faster, safer and, in short, even more durable and profitable. Its characteristic features and technical peculiarities will be commented on below in this descriptive report accompanied by explanatory illustrations.

SUMMARY OF THE INVENTION

The aforementioned juice extractor is composed of a cylindrical central body, obtained by means of extrusion, this being a method widely used in modern practice, offering remarkable qualities concerning finish and neat presentation, without the need for subsequent operations; thin walls are achieved by means of this process, thus saving on material, without detracting from its intrinsic quality in any way. This has obvious advantages over commonly used methods, such as the classic sand-casting process, in which the surfaces have to be subsequently machined for essential finishing.

The electric motor activating the extractor is situated inside the central body referred to above, which also includes the appropriate sealing lid, with its cylindrical structure, that acts as the lower base of this central body, and into which is screwed the stand supporting the whole appliance forming the subject of this description. This stand is composed of a single part cupped at the centre, providing two heights with predetermined functions; the upper part which should be fixed to the lower part of the extractor beneath the aforementioned lid, allowing the cable to be wound up so that it occupies less space but may expand as necessary; and the lower area, which should serve as support and anchorage for the whole unit, with the appropriate stops or flexible sheet of rubber or similar material on the bottom of this base to stop it from sliding and to ensure that it is correctly fixed to the appropriate surface.

Logically, in the upper part of this central body there is a sealing lid which is circular at the bottom and has a hole at the centre for the driving shaft. This hole is supplied with the necessary means of watertight adjustment or stops designed to prevent liquids or dampness from entering, thus protecting the electric motor and, consequently, giving it longer life. This lid is provided with rods or projecting studs on its lower inner surface, which are positioned almost contiguous to the side. These are threaded inside so as to allow the fixing screws of the motor to be inserted. On the upper surface of the aforementioned lid there is a series of blind holes for fixing the centering stubs of the extractor head, the body of which is formed by two superimposed parts fitted together under pressure, with the lower part having a semi-spherical cross-section, supplied with an outlet at the bottom for the exit of the liquid or juice extracted, made of a short length of tubing to which is fitted the conduction pipe of the aforementioned juice, set at a downward angle with an elbowed pipe at its free end to allow the liquid to flow out vertically.

Another similar part with the same exterior shape is fitted upside-downto the upper end of this lower part; sloping it towards the interior allows it to be fitted without protruding outside. In the upper part of this complementary body there is a horizontal edge flanged towards the interior, which makes a wide circular inlet through which the product to be squeezed is introduced.

The aforementioned shaft is screwed on to another end shaft optionally fitted with a hexagonal rod, on top of which is located the extracting cone, manufactured with convex outer walls and rounded apex finished in a stub or upper appendage designed to provide better centering of the product referred to; this cone has the appropriate longitudinal grooves to facilitate squeezing, while its base, formed by a horizontal flange, joins the squeezing cone to the filtering or straining component, which is composed of an open receptacle at the bottom, optionally cylindrical in shape, with the side and bottom walls thus being provided with a suitable grille or filter through which only the squeezed juice may pass, with the non-usable pulp remaining inside. This filter is capable of turning together with the aforementioned extracting cone, thus allowing for centrifugal filtering and, in this way, making the essential action of extracting liquids faster and more efficient.

Furthermore, the extractor concerned in this invention has an auxiliary arm which enables the function described to be accelerated by exerting pressure on the product in question. The fixed part of this arm is screwed to the upper base of the central cylindrical body; it is slightly curved in shape, lying close to the upper body, and has a joint at an intermediate point with this body, from which protrudes the mobile lever for accelerating the extracting process. This is composed of a rectangular body with a longitudinal shape following the upper contours of the extractor, and ending in a slight bend near the free end, forming a handle for working the lever of the arm.

The arm thus defined has a switch below the joint, activated by means of a cam situated at the lower end of the lever. This is activated when lowered and deactivated when raised and there is no contact between the cam and the switch.

Screwed to the horizontal part of the lever of the aforementioned activating arm is a circular lid designed to cover the hole or outlet of the upper area of the extracting device, there being a concentric cap beneath this lid adaptable to the extracting cone, with which pressure is exerted on the product by working the lever referred to above, so as to bring this closer to the aforementioned cone, and therefore achieve greater effectiveness.

Electricity is supplied by means of a main switch, preferably situated near the base of the extractor proposed; this mechanism is complemented by the switch referred to above, located beneath the joint of the lever arm.

Both the anchoring of the arm referred to and that of other parts that need to be secured, is accomplished by means of screws of the same model and bore, so as to allow the appliance to be assembled and disassembled easily and quickly with the same spanner.

In a simplified version of the extractor described, it is not necessary to install the lever arm and its accessories, the filtering component being substituted by another simpler part along with a micro-switch which is worked by exerting pressure on the extracting cone.

The aforementioned filtering or straining component is fitted under pressure inside the upper body. It may be easily removed for cleaning and is adaptable in form to the internal process of this extractor body, in such a way that all the juice obtained falls on to the strainer or filter. the base of which coincides with the duct leading to the exit through the elbowed pipe mentioned previously.

The extracting cone is removed, in either case, by pulling it up to uncouple it from the hexagonal rod, so as to facilitate cleaning.

The rod activating the extractor may be the driving shaft itself or, on the other hand, be formed by this shaft and a body surrounding it axially, separated by an internal spring, the pressure of which is broken by pressing on the extracting cone, which makes the aforementioned body move down until a horizontal ring-shaped end comes into contact with the micro-switch which works the motor.

BRIEF DESCRIPTION OF THE DRAWINGS

The following detailed description refers to the accompanying illustrations in which the processes we consider suitable and in accordance with the preceding report are given by way of example, without being restrictive in any way, since practical experience may suggest slight modification without essentially altering the invention.

FIG. 2, a similar view of a detail of the anchorage of this arm for activating the upper sealing lid of the extractor.

FIG. 3, a view from the bottom of the same anchorage unit.

DESCRIPTION OF THE PREFERRED EMBODIMENT

Figure 1:
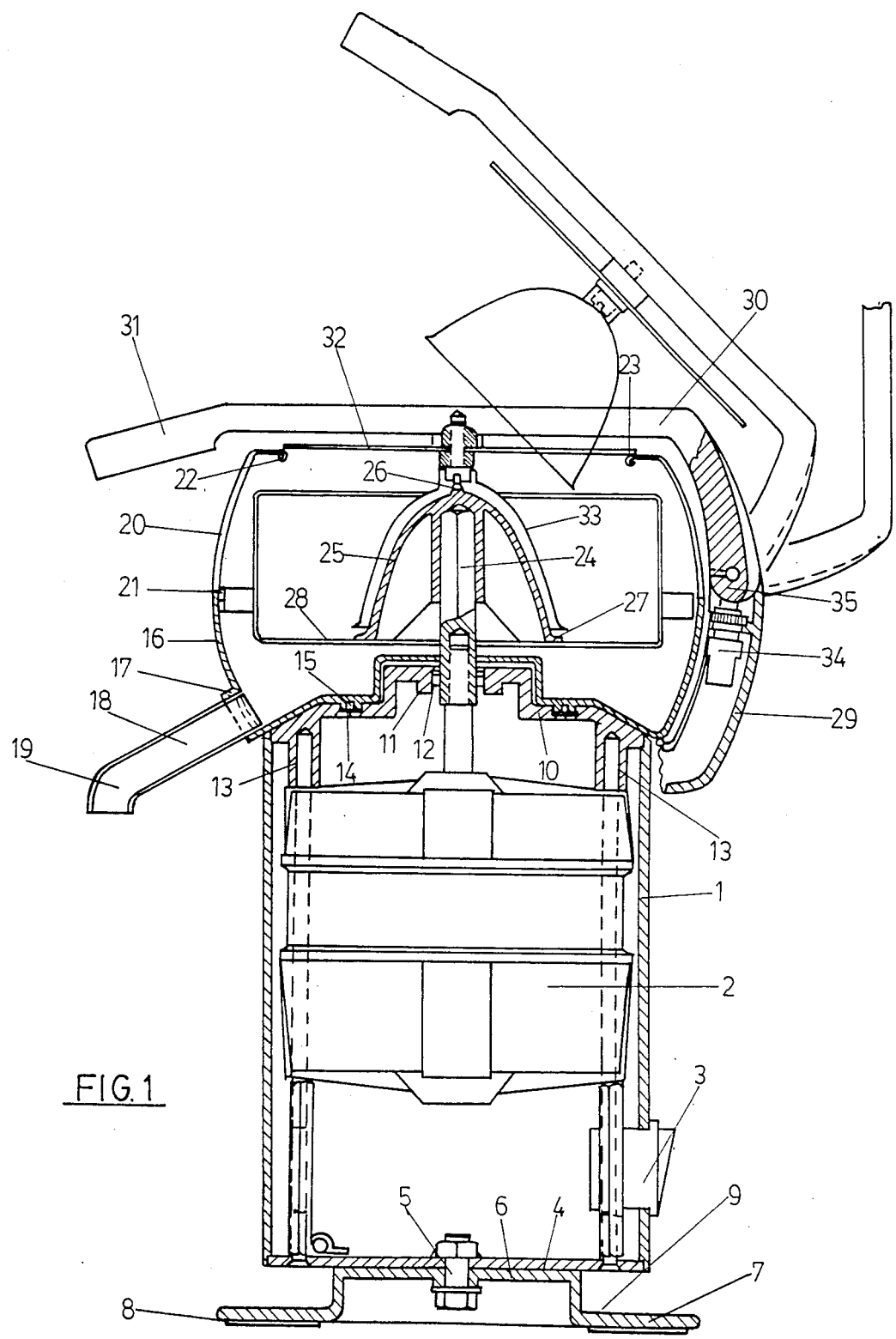
FIG. 1 represents a vertical section through the middle of the extractor including the lever arm.

FIG. 1 shows firstly the central cylindrical body - 1 - inside which is located the electric motor - 2 - activating the extractor and below this, the general supply switch - 3 - which connects or disconnects the appliance from the mains. On the base of the central cylindrical body the lid - 4 - can be seen to which is fixed the base or stand by means of a screw and nut - 5 -. This base or stand is formed by a cylindrical plate cupped at the centre in such a way that this base comprises a body of two heights: the upper or central one - 6 - and the lower one - 7 - which together with their corresponding anti-sliding bases - 8 - stabilize the whole unit. This plate is diametrically mortised to house the supply cable when wound up, so that this does not protrude outside, and allows it to be extended adequately as required by the moment and the position of the extractor, adjusting to the distance required.

As a sealing component for the central body - 1 - the appliance is supplied with a graded lid - 10 - with a central hole - 11 - through which emerges the driving shaft, with the corresponding sealing stop - 12 - being provided for its adjustment to this hole for the purpose mentioned above. Inside this lid on its lower surface there are some rods or studs - 13 - which are threaded inside for fitting the fixing or anchoring screws of the motor. On the upper surface of the lid of the motor, at an intermediate point are situated the centering holes - 14 - over which are fitted the centering appendages - 15 - of the upper body - 16 - which is supplied with a hole - 17 - on its lower edge, for the exit of the liquid. Into this hole is inserted the pipe - 18 - under pressure which is conveniently elbowed at its free end - 19 - so as to allow the juice obtained to flow out vertically. To the aforementioned body - 16 - is fitted under pressure, another similar superimposed body - 20 - with grading - 21 - on its lower edge towards the interior, and suitable for inserting in the aforementioned body - 16 - . This upper body has a horizontal section along its upper edge - 22 - fiished off with an inwardly curving flange - 23 - marking a wide circular inlet through which the product to be squeezed is introduced.

The squeezing mechanism is situated inside the extractor and is connected to the driving shaft by means of a complementary rod with hexagonal head - 24 - to which is fitted the extractor head itself - 25 - with the shape described above and protuberance - 26 - such that the fruit to be squeezed may be centered more efficiently. On the walls of this head there are grooves designed to carry out their appropriate function and a horizontal flap - 27 - for anchorage to the filtering component - 28 -. This is composed of a cylindrical receptacle joined to the extracting cone, with holes on its side walls allowing the centrifugal passage of the juice obtained, while at the same time retaining the surplus pulp.

A side arm is supplied as an accessory to the extractor formed by a fixed body - 29 - connected to the lid - 10 - mentioned above, by means of screws, on which the rest of the arm is articulated as a lever - 30 -with a downward bend near its free end forming a handle - 31 - to make it easier to manipulate this lever.

A circular sealing lid - 32 - is fitted to the interior surface of the lever arm, also by means of screws, and below this there is a cap - 33 - which exerts pressure on the product to be squeezed in such a way that this task is made easier since the extracting component - 25 - may be adjusted in shape by exerting pressure on the lever arm.

There is a micro-switch - 34 - on the fixed arm - 29 - designed to activate the motor and provided with a push button worked by the cam - 35 - of the lever arm - 30-.

FIG. 2 shows a detail of the anchorage of the fixed part - 29 - of the arm crossed by the hole - 36 - in the body - 1 - and connected to the upper sealing lid - 10 - by means of screws designed for this purpose, described with their reference numeral - 37 -.

FIG. 3 provides a view from the bottom of the aforementioned anchorage shown in detail in the previous figure, indicating the reference numerals - 29 - and - 37 -referred to above.

Figure 4:
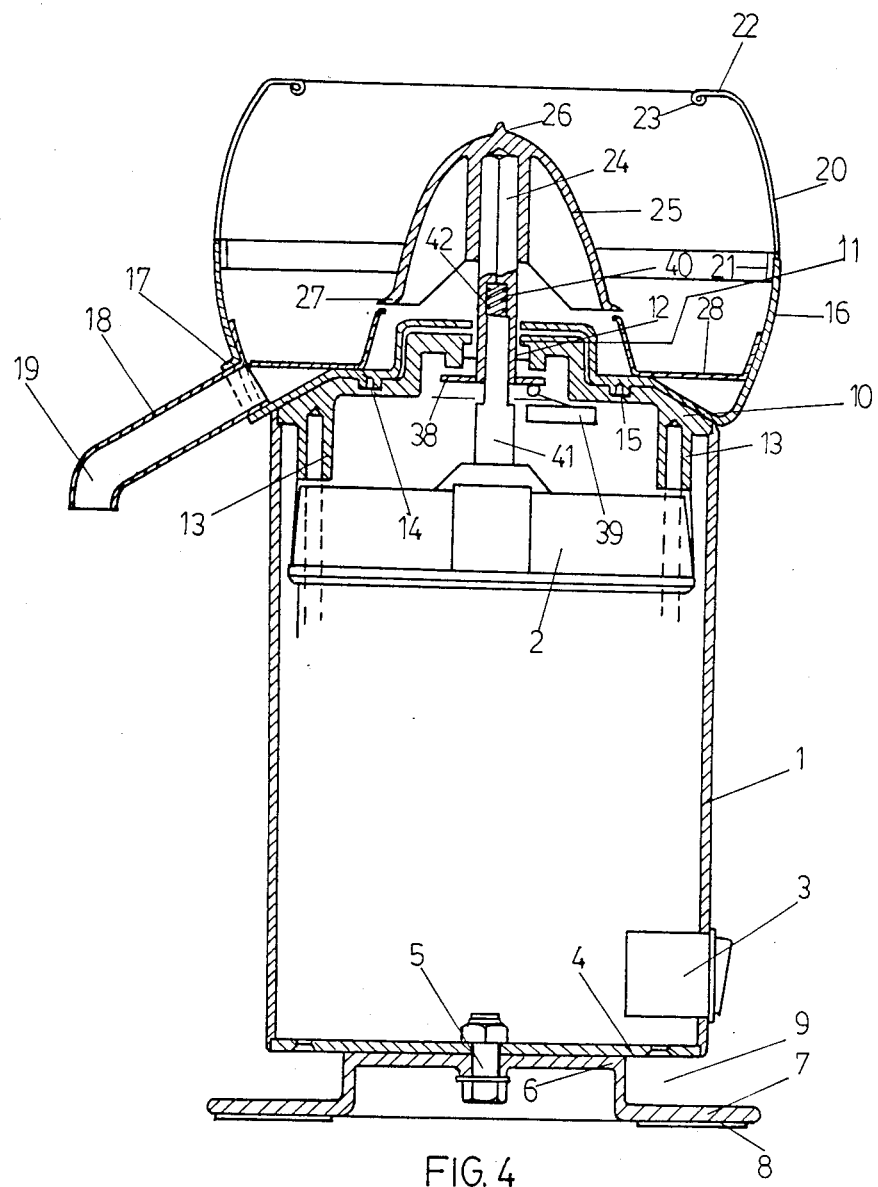
FIG. 4, another section through the middle of the simplified version of the extractor.

In the simplified version illustrated in FIG. 4, in addition to the common details indicated with reference numerals - 1- to - 28 -, one can see the ring-shaped flange - 38 - contacting the micro-switch - 39 -, the hole - 40 - for coupling the driving shaft - 41 - between which is inwardly situated the helicoidal spring - 42 - which allows the axle of the extracting cone to recover once pressure is removed by disconnecting the micro-switch. This micro-switch may also be eliminated in such a way that the shaft - 24 - will be composed of one or several concentric parts that transmit their movement directly to the extracting cone - 25 - when the main switch is activated - 3 - as desired.

Having adequately described the object of the present invention, it should be pointed out that a great many variations in detail enjoying the same protection may be added to the essential features of the appliance, with these possibly affecting the unit itself or its parts as well as the components selected and the means for producing the system designed, or indeed any other modifications deemed appropriate.

I claim:

1. A juice extractor, comprising in combination, an extruded, open top cylindrical body having an axis and having a closed bottom cover; an electric activating motor positioned within said cylindrical body and including a motor drive shaft; a base attached to the bottom cover and including a cup shaped center portion having a generally circular lower flange extending therefrom outwardly beyond said cylindrical body and spaced axially from said bottom cover, said flange including friction pads on a lower surface, the cup shaped portion of the stand defining an annular recess for winding up and storing various lengths of an electric cable for connecting the motor to an electric main supply; juice extractor means connected with and driven by the motor and positioned above the cylindrical body; juice extractor housing means positioned above said motor for housing said extractor means; and switch means for activating said motor, said switch means positioned above the motor and spaced from the motor drive shaft.

2. An extractor according to claim 1 with a sealing upper lid mating with and closing the open top of the cylindrical body and having an axial central hole about which a seal is fitted and through which the drive shaft of said motor extends, threaded rod means for mounting the motor against said sealing lid, said rod means extending through the closed bottom cover and engaging the sealing lid to hold it in place and to hold the motor in place, and positioning slots in the outer upper surface of the sealing lid for engaging and registering with corresponding positioning projections carried by the juice extractor housing means for non-rotatably positioning said extractor housing means relative to said sealing lid.

3. An extractor according to claim 1 wherein the juice extractor housing means includes an outer body having two sections partly semispherical in shape joined as upper and lower halves, the lower half having a closed bottom including a juice outlet for the exit of juice and including an elbowed outlet pipe and an axial hole for receiving the motor drive shaft, means joining the two halves formed inside the two sections to provide a smooth spherical outer surface, and a central open top in the upper half for entry of a product to be juiced.

4. An extractor according to claim 3, wherein said extractor means includes a rotatable extractor cone driven by said motor drive shaft, and a removable filter plate disposed between the extractor cone and the juice outlet to retain pulp and pass juice.

5. An extractor according to claim 1, wherein said extractor means includes a rotatable extractor cone drivingly connected to said motor drive shaft, a cylindrical member with filter apertures in its bottom and sides for retaining pulp and passing juice, said cylindrical member coupled to the bottom of the extractor cone for rotation therewith.

6. An extractor according to claim 1, wherein said extractor means includes a rotatable extractor cone drivingly connected to said motor drive shaft, wherein the extractor cone has a protuberance vertically extending from its apex for engaging and centering the product to be juiced.

7. An extractor according to claim 1, wherein said extractor means includes an extractor cone drivingly connected with said motor drive shaft, a squeezing arm pivoted on a member affixed to the sealing lid of the cylindrical body, said arm extending over the top of the extractor cone and carrying a cap mating with and positioned over the cone to exert pressure on a product to be squeezed, said arm defining a handle for manual manipulation.

8. An extractor according to claim 7, wherein the squeezing arm carries cam means adjacent its pivot position, and said switch means is actuated by the cam means to rotate the extractor cone as the cap is in overlying relationship with the extractor cone.

9. An extractor according to claim 1, wherein said extractor means includes a rotatable extractor cone drivingly connected with said motor shaft for rotatably driving said cone and axially movable relative to said drive shaft, said cone carrying an outwardly extending flange, spring means for biasing the cone axially away from the motor shaft, said switch means operable by said cone flange when the force of said spring means is overcome by pressing against the extractor cone a product to be juiced.

10. An extractor according to claim 1, wherein said extractor means and said switch means are positioned on the same side of said motor as the motor drive shaft.

* * * * *